(12) United States Patent
Todorovic et al.

(10) Patent No.: US 9,546,619 B2
(45) Date of Patent: Jan. 17, 2017

(54) AIRCRAFT GAS TURBINE THRUST-REVERSING DEVICE HAVING A GUIDE RAIL

(71) Applicants: Rolls-Royce Deutschland Ltd & Co KG, Blankenfelde-Mahlow (DE); Premium AEROTEC GmbH, Augsburg (DE)

(72) Inventors: Predrag Todorovic, Berlin (DE); Sergiu Irimie, Augsburg (DE)

(73) Assignees: ROLLS-ROYCE DEUTSCHLAND LTD & CO KG, Blankenfelde-Mahlow (DE); PREMIUM AEROTEC GMBH, Augsburg (DE)

( * ) Notice: Subject to any disclaimer, the term of this patent is extended or adjusted under 35 U.S.C. 154(b) by 0 days.

(21) Appl. No.: 14/880,854

(22) Filed: Oct. 12, 2015

(65) Prior Publication Data

US 2016/0115903 A1 Apr. 28, 2016

(30) Foreign Application Priority Data

Oct. 16, 2014 (DE) .................. 10 2014 221 052

(51) Int. Cl.
| | |
|---|---|
| F02K 1/76 | (2006.01) |
| B64D 29/06 | (2006.01) |
| F02K 1/72 | (2006.01) |

(52) U.S. Cl.
CPC .............. *F02K 1/763* (2013.01); *B64D 29/06* (2013.01); *F02K 1/72* (2013.01); *F05D 2250/75* (2013.01); *F05D 2300/603* (2013.01)

(58) Field of Classification Search
CPC ............ F02K 1/72; F02K 1/763; F02K 1/766; B64D 29/06

(Continued)

(56) References Cited

U.S. PATENT DOCUMENTS

| | | | |
|---|---|---|---|
| 4,442,987 A * | 4/1984 | Legrand ................ | B64D 29/08 |
| | | | 239/265.25 |
| 4,683,717 A | 8/1987 | Naud | |

(Continued)

FOREIGN PATENT DOCUMENTS

| | | |
|---|---|---|
| EP | 0155887 A1 | 9/1985 |
| FR | 2002926605 A1 | 7/2009 |

(Continued)

OTHER PUBLICATIONS

European Search Report dated Feb. 16, 2016 for counterpart European application No. 15189354.2.

(Continued)

*Primary Examiner* — Carlos A Rivera
*Assistant Examiner* — Stefan Ibroni
(74) *Attorney, Agent, or Firm* — Shuttleworth & Ingersoll, PLC; Timothy J. Klima

(57) ABSTRACT

The present invention relates to an aircraft gas turbine thrust-reversing device with an engine having an engine cowling whose rear area can be moved in the axial direction of the engine from a closed forward-thrust position into a rearward moved thrust-reversing position in which a free, substantially annular space to a front and fixed area of the engine cowling is present, where on the engine cowling guide rails are arranged, inside which mounting elements can be moved by means of rolling or sliding elements, with which mounting elements the rear area of the engine cowling is mounted, characterized in that the guide rails have an oval and C-shaped cross-section, provided on a longitudinal side with a slot-like opening, and are mounted using mounting projections arranged centrally and opposite to one another and designed in one piece with the C-shaped cross-section.

5 Claims, 4 Drawing Sheets

(58) Field of Classification Search
IPC .............. F02K 1/72,1/763, 1/766; B64D 29/06
See application file for complete search history.

(56) References Cited

U.S. PATENT DOCUMENTS

| | | | |
|---|---|---|---|
| 6,592,074 B2* | 7/2003 | Dehu | F02K 1/72 |
| | | | 244/110 B |
| 6,824,101 B2 | 11/2004 | Sternberger et al. | |
| 9,157,395 B2 | 10/2015 | Vache et al. | |
| 2010/0064660 A1 | 3/2010 | Vauchel et al. | |
| 2011/0277448 A1 | 11/2011 | Roberts | |
| 2013/0161415 A1 | 6/2013 | Bellanger et al. | |
| 2015/0152744 A1* | 6/2015 | Le Boulicaut | F02K 1/68 |
| | | | 415/200 |

FOREIGN PATENT DOCUMENTS

| | | |
|---|---|---|
| FR | 2997925 A1 | 5/2014 |
| WO | WO2012022900 A1 | 2/2012 |
| WO | WO2014023901 A1 | 2/2014 |
| WO | WO2014072655 A1 | 5/2014 |

OTHER PUBLICATIONS

German Search Report dated Jun. 7, 2015 from counterpart App No. 10 2014 221 052.6.

* cited by examiner

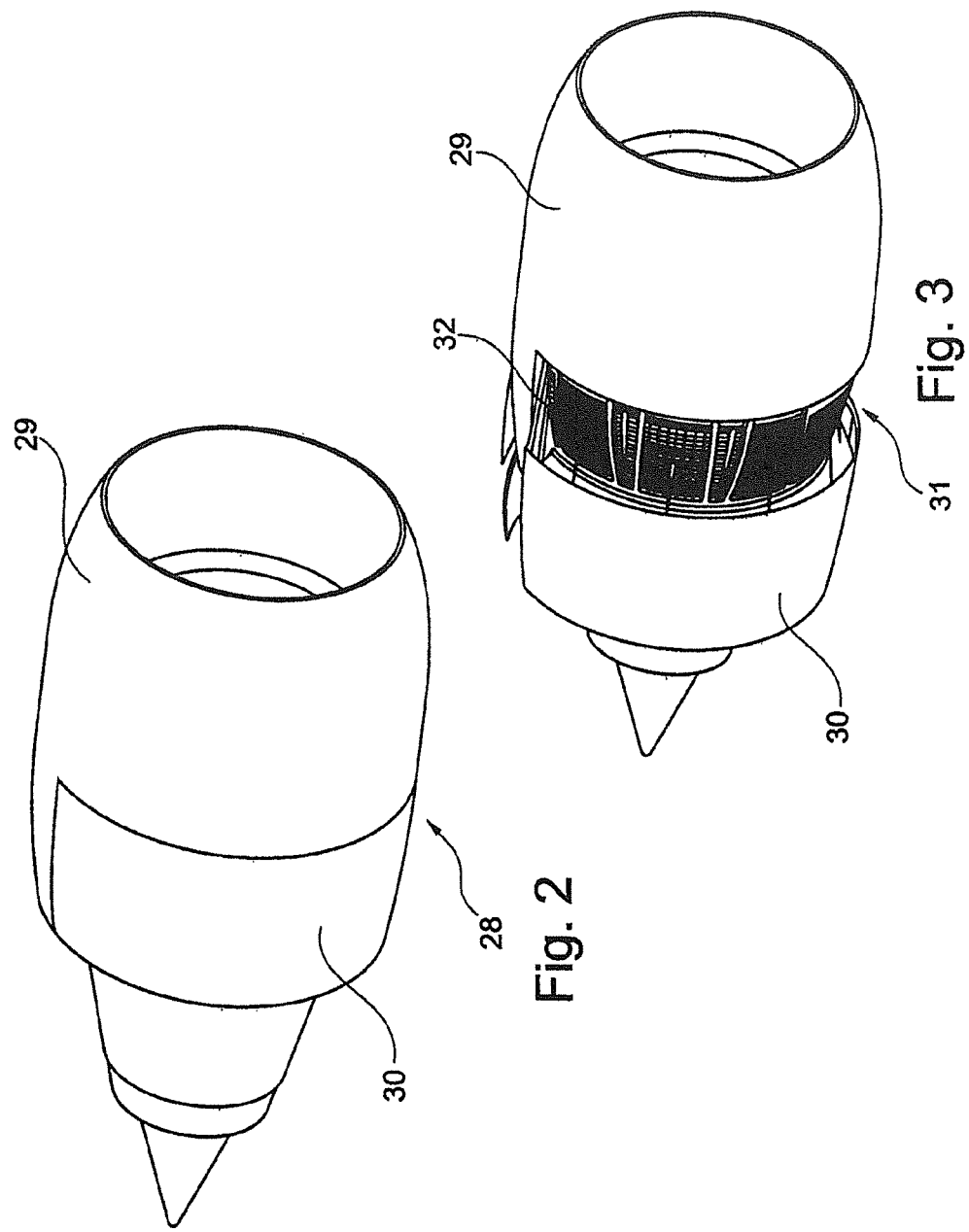

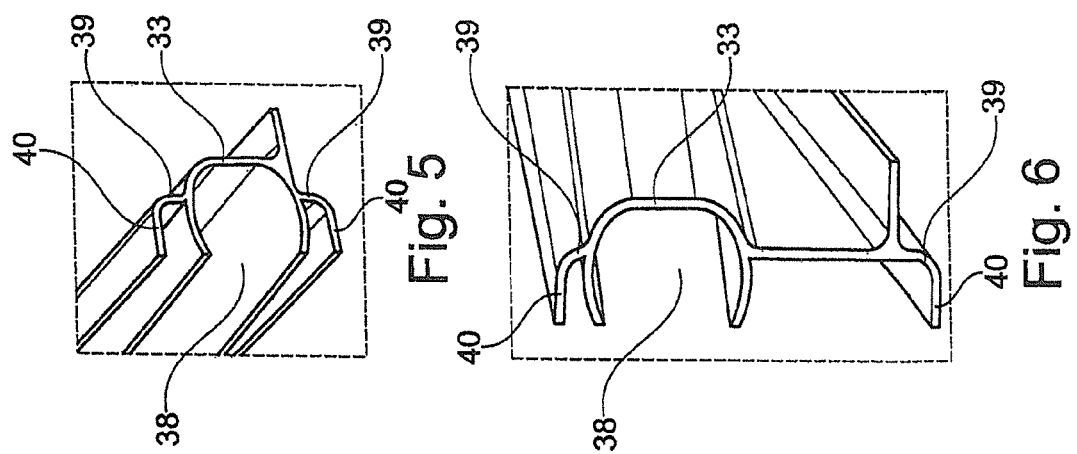
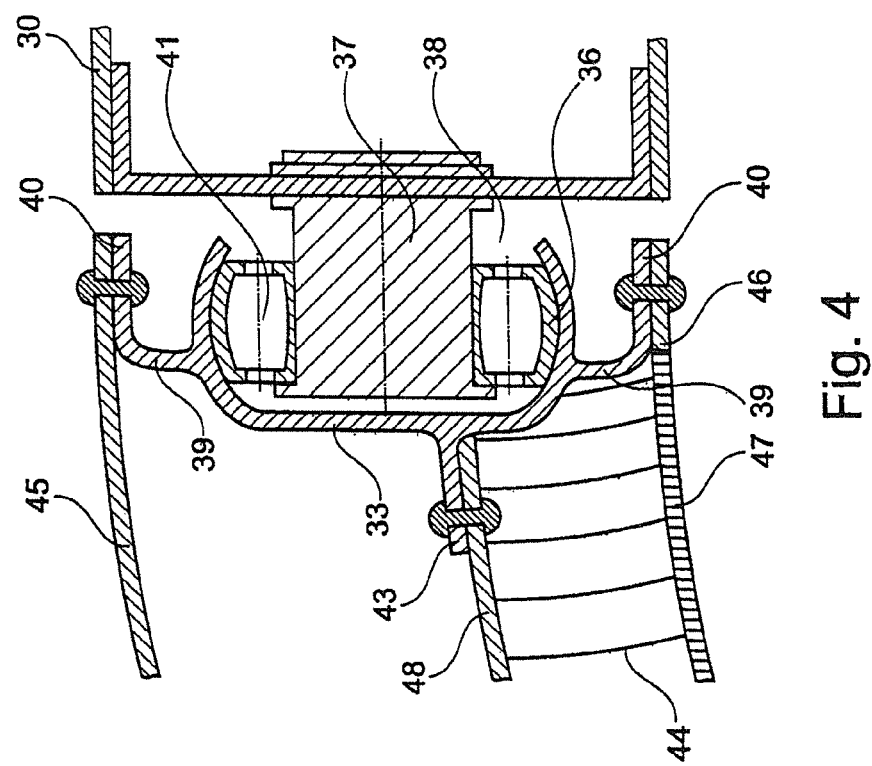

AIRCRAFT GAS TURBINE THRUST-REVERSING DEVICE HAVING A GUIDE RAIL

CROSS-REFERENCE TO RELATED APPLICATION

This application claims priority to German Patent Application No. 10 2014 221 052.6 filed on Oct. 16, 2014, the entirety of which is incorporated by reference herein.

BACKGROUND

This invention relates to an aircraft gas turbine thrust-reversing device with an engine having an engine cowling and with several variable-position deflecting elements arranged on the circumferential area.

SUMMARY

In detail, the invention relates to a compactly building guide rail concept for an aircraft gas turbine thrust-reversing device, which is assigned to an engine having an engine cowling whose rear area can be moved in the axial direction of the engine from a closed forward-thrust position into a rearwardly moved thrust-reversing position in which a free, substantially annular space to a front and fixed area of the engine cowling is present. It is provided here that on the engine cowling guide rails are arranged, inside which mounting elements can be moved by means of rolling or sliding elements, with which mounting elements the rear area of the engine cowling is mounted.

With the solutions known from the state of the art, it has proved to be a disadvantage that the guide rails have a large space requirement. For that reason, the possibility for attaching damping structures for sound absorption is considerably restricted. The previously known design variants are expensive to manufacture in terms of load paths (transmission) and fastening of the guide rail, and entail a high weight.

The object underlying the present invention is to provide an aircraft gas turbine thrust-reversing device of the type specified at the beginning which, while being simply designed and easily and cost-effectively producible, enables a space-saving guide rail structure that can be implemented with low weight.

It is a particular object to provide a solution to the above problems by a combination of features described herein. Further advantageous embodiments will become apparent from the present description.

It is thus provided in accordance with the invention that the guide rails have an oval and C-shaped cross-section, provided on a longitudinal side with a slot-like opening, and are mounted using mounting projections arranged centrally and opposite to one another and designed in one piece with the C-shaped cross-section.

The solution in accordance with the invention therefore offers the possibility for designing the guide rails considerably narrower. The term oval must be understood within the scope of the invention as an embodiment which has a greater extent in one longitudinal direction than in the other longitudinal direction. It is thus possible in accordance with the invention to accommodate rolling or sliding elements of large diameter inside a narrow guide rail. With the fastening provided in accordance with the invention and using the mounting projections arranged centrally and opposite to one another, the guide rail can be fastened in a space-saving manner, resulting in additional weight savings. Furthermore, additional installation space is made available due to the narrower rails and can be used for a damping structure.

The engine cowling provided in accordance with the invention encloses the engine concentrically to the engine axis. Accordingly, the engine cowling rear area to be moved axially is likewise designed substantially annular or partially annular. The guide rails in accordance with the invention extend substantially parallel to the engine axis, so that a narrower design of the guide rails leads to the latter being narrower in the circumferential direction of the engine cowling. This results in the free space described above for accommodating the damping structure, in particular in the circumferential direction of the engine cowling.

In a particularly favourable embodiment of the invention, it is provided that the mounting projections are arranged on the narrow sides of the oval cross-section. The mounting projections are thus arranged, relative to the installation situation of the guide rails, radially internally and radially externally to the engine axis. This results in a favourable force flow inside the guide rail.

The mounting projections are designed preferably angled at their free end areas in order to permit simple, cost-effective and weight-optimized fastening to the respective areas of the engine cowling.

It can furthermore be favourable when the guide rail has at its center area, opposite to the opening extending in the longitudinal direction of the guide rail, a fastening projection. This is used for additional mounting of the guide rail or for fastening a wall of the radially internal damping structure. The damping structure is preferably designed as a honeycomb structure or in a similar way.

The rolling or sliding elements provided in accordance with the invention, which are movable along the guide rail at its inner cross-section, are designed, in a favourable development of the invention, in the form of outer races of a spherical anti-friction bearing. Said spherical anti-friction bearing results in a wide freedom of movement. It is however also possible to provide standard cylindrical anti-friction bearings.

In a particularly advantageous embodiment of the invention, it is provided that the guide rail is produced from a composite material, in particular from a plastic resin provided with fiber reinforcement. The mounting projections and the fastening projection too are preferably designed in one piece with the guide rail and are produced from this material. Furthermore it can be particularly favourable when the guide rail is designed in one piece with at least one structural element of the thrust-reversing device, for example a guide element for cascades or similar.

In accordance with the invention it is advantageously achieved that additional direct load paths are created on the guide rail, contributing to an optimized embodiment of the guide rail. By the use in accordance with the invention of a composite material, the structure is optimized and the result is an improved orientation of the fibers in the fiber reinforcement. Overall, the number of individual parts is considerably reduced in comparison with the state of the art, resulting in a lower weight and lower manufacturing costs. Furthermore, the reduced installation space of the guide rail leads to the possibility of designing the damping structure larger and/or of needing a smaller surface area for the noise-damping surface.

Within the framework of the invention, the inventive design of the guide rail can also be used with other structural components of an aircraft gas-turbine engine, where longitudinal movements have to be carried out, for example with a variable fan nozzle.

The present invention is described in the following in light of the accompanying drawing, showing exemplary embodiments. In the drawing,

BRIEF DESCRIPTION OF THE DRAWINGS

FIGS. 2, 3 show perspective views of an aircraft gas turbine in accordance with the present invention, obliquely from the front in forward thrust position and thrust reversal position, respectively, FIG. 4 shows a simplified side view in sectional representation of an exemplary embodiment of a guide rail in accordance with the present invention in the installed position, FIG. 5 shows a perspective partial view of a further exemplary embodiment of the guide rail, FIG. 6 shows a further modification of the guide rail in accordance with the present invention.

DETAILED DESCRIPTION

Figure 1:
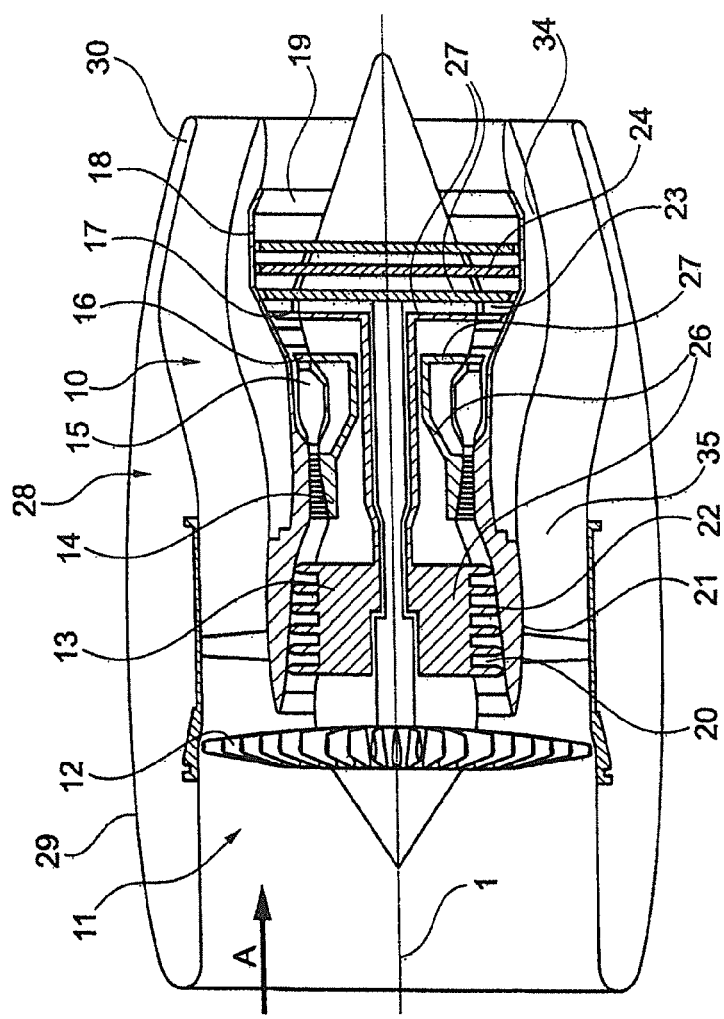
FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, an annular combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 1 furthermore shows a core engine cowling 34 of a bypass duct 35 as well as an outer engine cowling 28.

FIGS. 2 and 3 each show simplified perspective representations of the aircraft gas turbine in accordance with the invention with a thrust-reversing device. FIG. 2 shows a forward thrust position in a view obliquely from the front, in which the engine cowling 28 is closed to permit an undisrupted flow through the bypass duct. It can be discerned here in particular that a front area 29, which remains stationary, of the engine cowling 28 forms the first part of the limitation of the bypass duct 35, while a rear area 30 of the engine cowling 28 can be displaced in the axial direction. FIG. 2 thus shows the forward thrust position, while FIG. 3 shows the thrust reversal position in which the rear area 30 of the engine cowling 28 is axially displaced. This results in a free annular space 31 which is interrupted only by the area of a pylon, not illustrated in detail, for mounting the aircraft gas turbine.

The deflecting elements 32 are designed grid-like or cascade-like and include a plurality of guiding elements designed for an optimized flow.

The deflecting elements 32 can for example be produced as castings or as composite parts.

In the description, the terms "front" and "rear" relate to the direction of flow through the aircraft gas turbine, where "front" corresponds to the inlet area and "rear" to the outlet area.

FIG. 4 shows a sectional view of a first exemplary embodiment of a guide rail 33 in accordance with the present invention in the installed position. The guide rail 33 has an oval or elongated and rounded cross-section, having on one side an opening 38 extending in the longitudinal direction. Inside the guide rail 33, a wheel axis-like mounting element 37 is mounted in longitudinally movable manner by means of a roller 36. Alternatively, a sliding element is also possible. The mounting element 37 is bolted to the cowling rear area 30 movable in the axial direction of the aircraft gas turbine. The roller 36 forms an outer race of an anti-friction bearing 41. The guide rail 33 has on its narrow side, radially externally and radially internally (relative to the engine axis 1), a mounting projection 39 in each case, whose end area 40 is bent over. The radially outer end area 40 (at the top in FIG. 4) is connected by means of bolts or rivets to an outer wall 45 of the engine cowling 28, while the radially inner end area 40 is connected to an inner wall 46. Said inner wall 46 is provided with components having recesses 47, to the inside of which components a damping structure 44 in honeycomb design is fastened. The damping structure 44 is limited by a rear wall 48, which is connected to a fastening projection 43 provided in the center area of the guide rail 33. The result is that the narrow design of the guide rail 33 in the circumferential direction provides more installation space for the damping structure 44.

Figure 8:
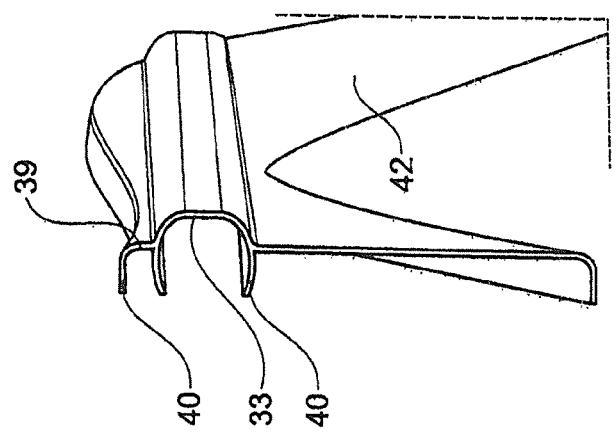
FIG. 8 shows a further detail view in a development of the exemplary embodiment of FIG. 7.
Figure 7:
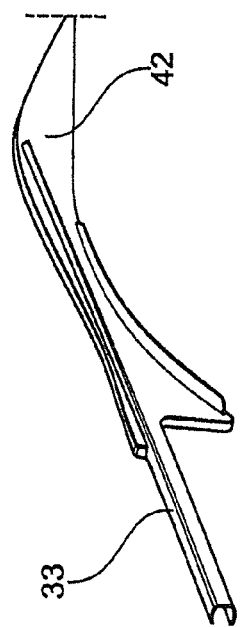
FIG. 7 shows a perspective view of a guide rail having an integrated structural element.

FIGS. 5 and 6 show modified cross-sections of the guide rail 33 in accordance with the invention. Overall, the guide rail 33 is, in accordance with the invention, made from a composite material, so that the modifications shown can be achieved with low weight and favourable manufacturing costs. It is also possible in accordance with the invention to provide a metallic insert in the composite material. FIGS. 7 and 8 show developments of the present invention in which the guide rail 33 is connected in one piece to at least one further structural element 42 which is part of the thrust-reversing device.

LIST OF REFERENCE NUMERALS

1 Engine axis/center axis
10 Gas-turbine engine
11 Air inlet
12 Fan rotating inside the casing
13 Intermediate-pressure compressor
14 High-pressure compressor
15 Annular combustion chamber
16 High-pressure turbine 17 Intermediate-pressure turbine
18 Low-pressure turbine
19 Exhaust nozzle
20 Guide vanes
21 Engine casing/cowling
22 Compressor rotor blades
23 Stator vanes
24 Turbine blades
26 Compressor drum or disk
27 Turbine rotor hub
28 Engine cowling (nacelle)
29 Front area of cowling
30 Rear area of cowling
31 Free annular space
32 Deflecting element (cascade)
33 Guide rail
34 Core engine cowling
35 Bypass duct
36 Roller
37 Mounting element
38 Opening
39 Mounting projection
40 End area
41 Anti-friction bearing
42 Structural element
43 Fastening projection
44 Damping structure
45 Outer wall
46 Inner wall
47 Recess
48 Rear wall

What is claimed is:

1. An aircraft gas turbine thrust-reversing device, comprising:
an engine cowling of an aircraft gas turbine, the engine cowling including a rear area that is movable in an axial direction of the aircraft gas turbine from a closed forward-thrust position to a rearwardly moved thrust-reversing position in which exposes a free, substantially annular space at a front and fixed area of the engine cowling;
a plurality of engine cowling guide rails attached to the engine cowling;
wherein each engine cowling guide rail includes a generally oval shaped cross-section including a long side connecting opposed first and second short sides, wherein the long side has a greater extent than the first and second short sides, a slotted opening extending along a length of the engine cowling guide rail, wherein the slotted opening is opposed to the long side and bounded by the first and second short sides;
a plurality of mounting elements can associated with each engine cowling guide rail, the mountain elements attached to the rear area of the engine cowling and positioned to extend through the slotted opening into an interior of the engine cowling guide rail, the mounting elements including at least one chosen from rollers and sliders engaging the engine cowling guide for allowing the mounting elements and the rear area of the engine cowling to be movable in the axial direction relative to the engine cowling guide rail;
wherein each engine cowling guide rail includes first and second mounting projection arranged opposite to one another on first and second shorter sides, respectively, with each mounting member position generally centrally on the respective shorter side, with the two mounting projections formed as a single piece with the engine cowling guide rail;
wherein the at least one chosed from rollers and sliders are outer rollers of spherical anti-friction bearings; wherein each guide rail includes a fastening projection directly attached and extending from a central portion area of the long side of the engine cowling guide rail.

2. The device in accordance with claim 1, wherein the mounting projections each include an angled portion at an end distal from the generally oval shaped cross-section; the angled portion extending at an angle to a portion of the mounting projection proximate the generally oval shaped cross-section.

3. The device in accordance with claim 1, wherein each engine cowling guide rail is formed from a composite material.

4. The device in accordance with claim 1, wherein each engine cowling guide rail includes at least one structural elements of the thrust-reversing device in a monolithic structure with the engine cowling guide rail.

5. The device in accordance with claim 1, wherein each engine cowling guide rail is oriented such that the long side is generally oriented is a radial direction with respect to a main axis of the aircraft gas turbine.

* * * * *